United States Patent [19]

Marik et al.

[11] Patent Number: 5,929,383
[45] Date of Patent: Jul. 27, 1999

[54] ROTATIONALLY UNRESTRAINED GROUNDING COUPLING FOR EXTERNAL GROUNDING OF FITTINGS

[75] Inventors: Gregory C. Marik, Germantown, Tenn.; Lawrence Burrough, Southaven, Miss.; J. Lawrence Cole, Memphis; James H. Whitehead, Collierville, both of Tenn.

[73] Assignee: Thomas & Betts Corporation, Memphis, Tenn.

[21] Appl. No.: 08/835,399

[22] Filed: Apr. 7, 1997

[51] Int. Cl.⁶ .................................................. H02G 15/02
[52] U.S. Cl. ................................................ 174/78; 439/98
[58] Field of Search ................................ 174/78, 845, 89, 174/51; 439/98, 97, 99, 100, 101

[56] References Cited

U.S. PATENT DOCUMENTS

| | | | |
|---|---|---|---|
| 1,941,905 | 1/1934 | Mair | 174/78 |
| 2,161,249 | 6/1939 | Dibner . | |
| 2,907,978 | 11/1959 | Bergan . | |
| 2,972,002 | 2/1961 | Wayman | 174/51 X |
| 3,027,533 | 3/1962 | Monson | 439/95 |
| 3,166,632 | 1/1965 | Woodman | 174/51 |
| 3,448,430 | 6/1969 | Kelly | 174/78 X |
| 3,492,625 | 1/1970 | Bromberg | 439/100 |
| 3,603,912 | 9/1971 | Kelly | 174/78 X |
| 3,609,631 | 9/1971 | Looney et al. | 439/100 |
| 3,967,872 | 7/1976 | Mooney et al. | 439/100 |
| 4,025,152 | 5/1977 | Jacobson | 439/801 |
| 4,090,029 | 5/1978 | Lundeberg | 174/51 |
| 4,210,374 | 7/1980 | Churla | 439/100 |
| 4,213,669 | 7/1980 | Wittes et al. . | |
| 4,248,490 | 2/1981 | Bachle | 439/98 |
| 4,806,108 | 2/1989 | Meinhardt | 439/100 |
| 4,875,864 | 10/1989 | Campbell | 439/100 |
| 5,197,907 | 3/1993 | Hurtgen . | |
| 5,681,172 | 10/1997 | Moldenhauer | 439/97 X |

FOREIGN PATENT DOCUMENTS

| | | |
|---|---|---|
| 1 227 969 | 11/1996 | Germany . |
| 245 508 | 8/1947 | Switzerland . |
| 1 268 162 | 3/1972 | United Kingdom . |
| 1 295 391 | 11/1972 | United Kingdom . |

OTHER PUBLICATIONS

Advertisement, Thomas & Betts Technical/Specification Catalog, p. G/668, 1994.

*Primary Examiner*—Kristine Kincaid
*Assistant Examiner*—Chau N. Nguyen
*Attorney, Agent, or Firm*—Hoffmann & Baron, LLP

[57] ABSTRACT

A grounding coupling sized for cooperation with a gland nut of a fitting to allow external grounding of such fitting via an external grounding conductor. The grounding coupling is configured for rotationally unrestrained cooperation with the gland nut when the gland nut is in an untightened condition with respect to the body of the fitting. The grounding coupling is further configured for rotationally restrained and electrically conductive cooperation with the gland nut when the gland nut is in a tightened condition with respect to the body of the fitting.

15 Claims, 9 Drawing Sheets

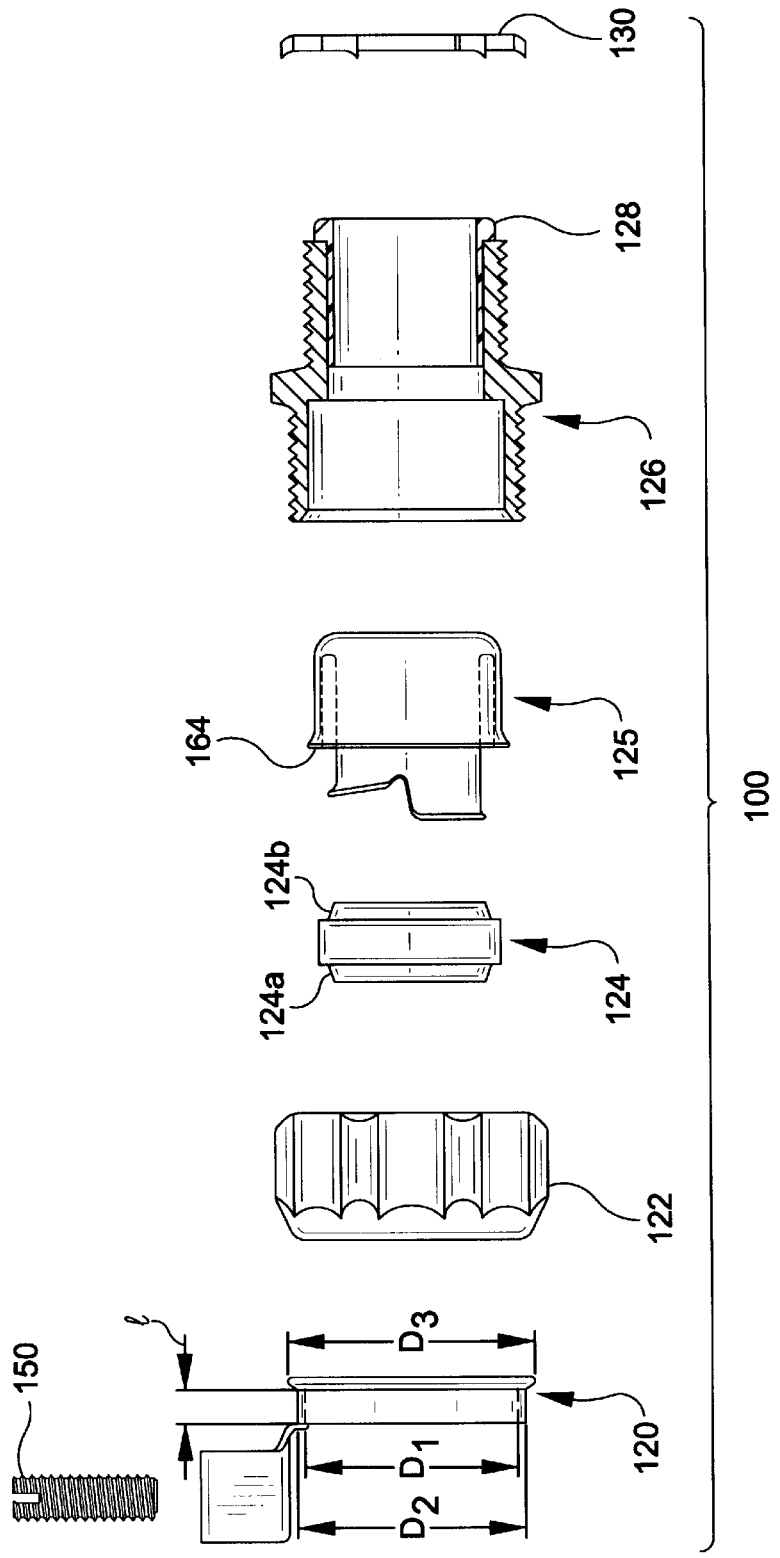

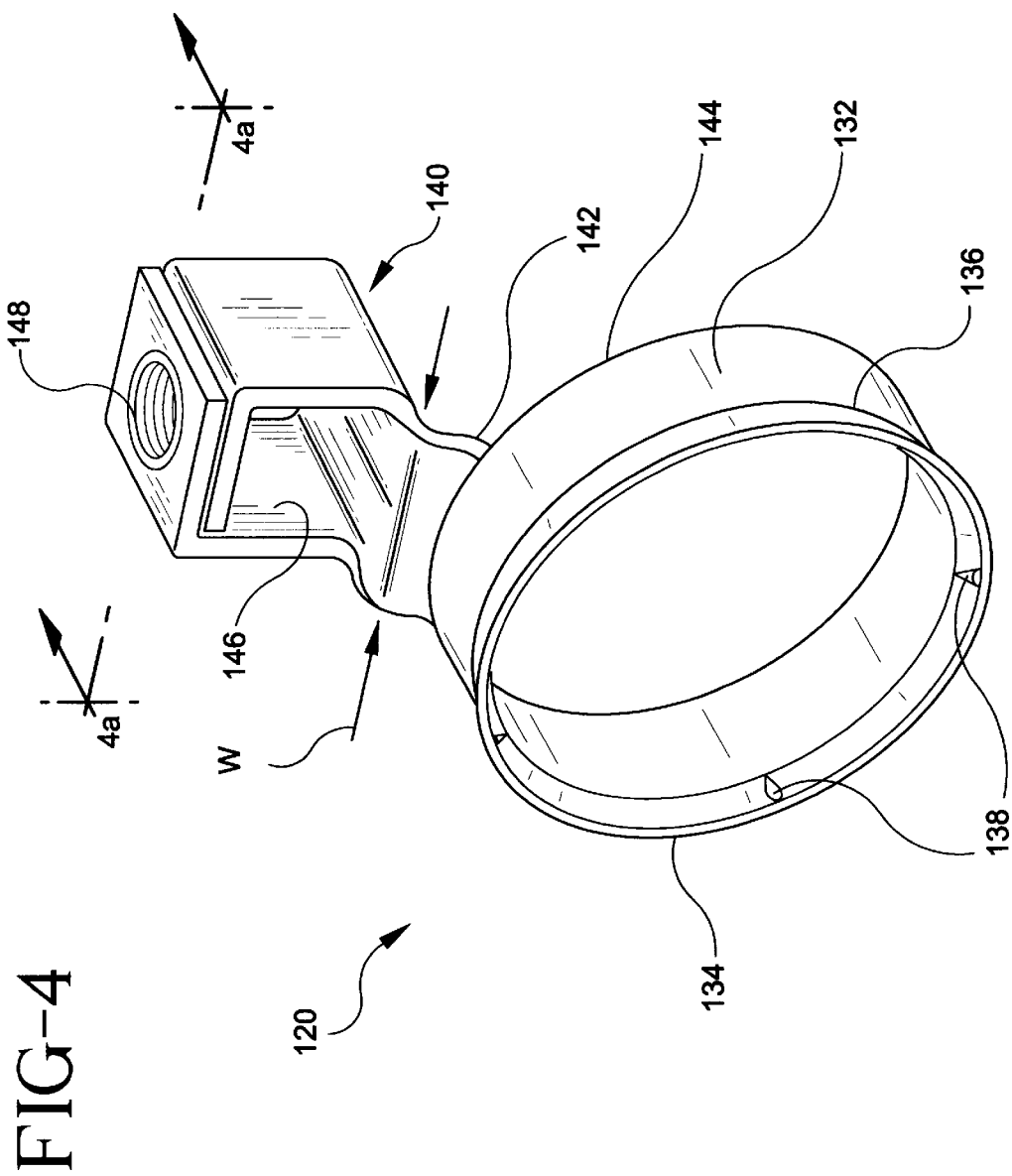

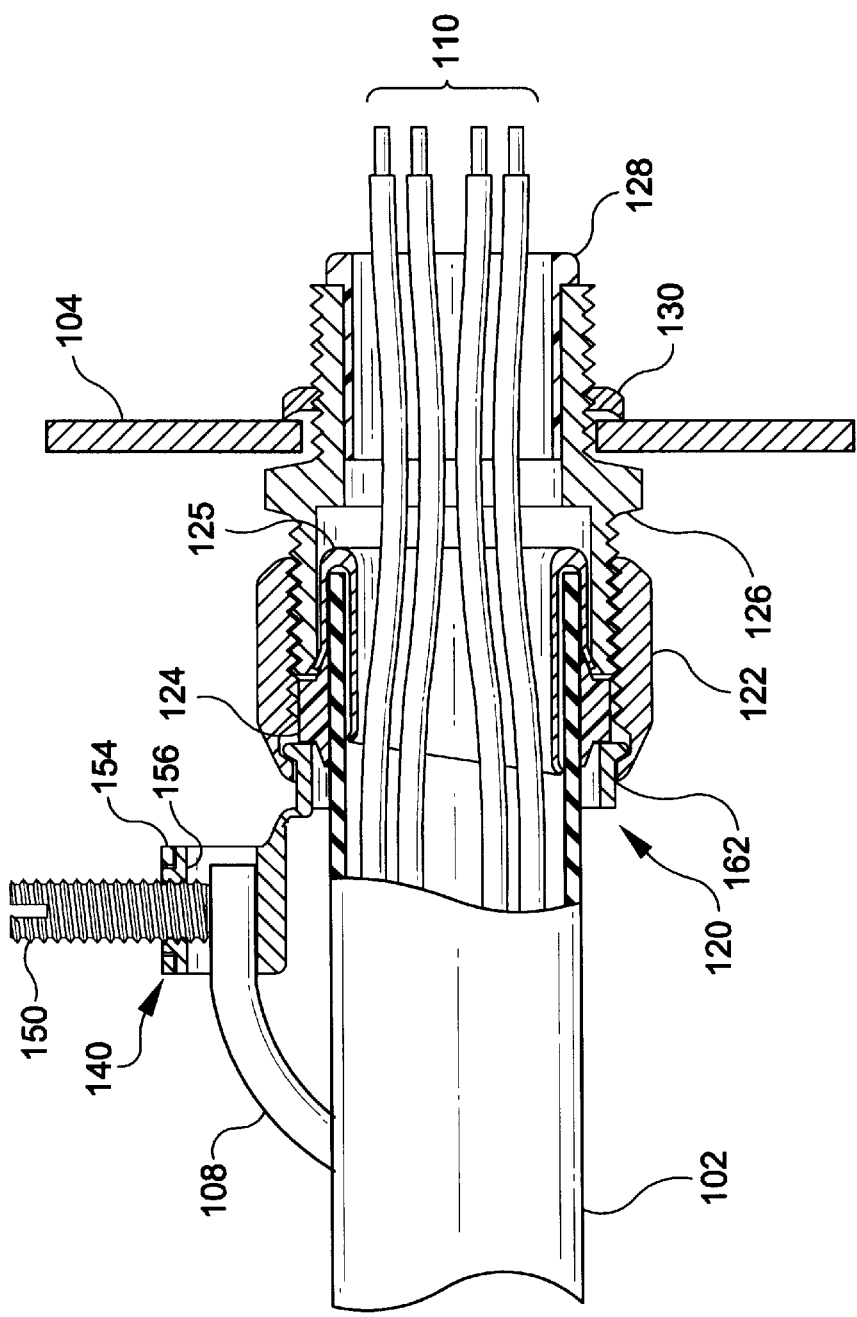

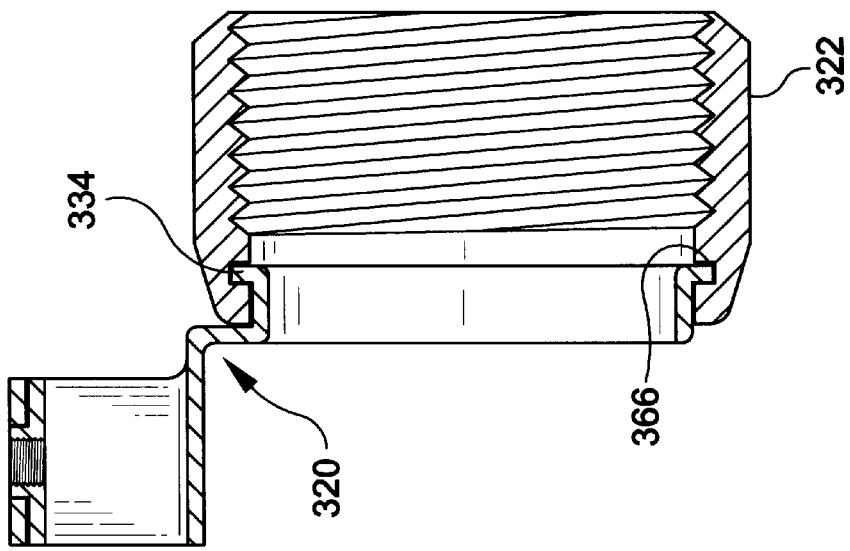
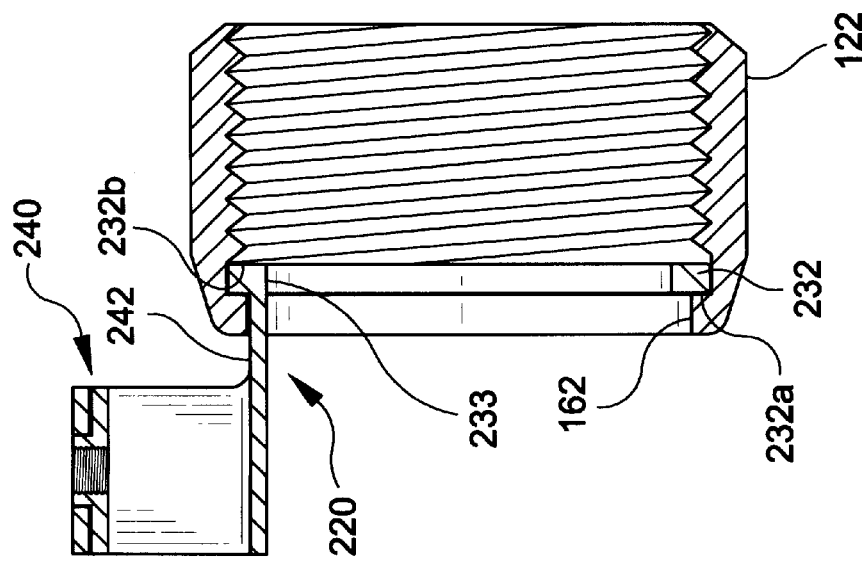

ROTATIONALLY UNRESTRAINED GROUNDING COUPLING FOR EXTERNAL GROUNDING OF FITTINGS

BACKGROUND OF THE INVENTION

The present invention relates to a grounding lug/gland nut assembly for external grounding of fittings and, more particularly, to a rotationally unrestrained grounding coupling which allows angular positioning of the lug attached thereto prior to tightening of the gland nut to the body of the fitting.

Various electrical codes require the installation of a secondary grounding conductor between fittings on opposing ends of a length of conduit. For example, the NEC (National Electrical Code) requires such a secondary grounding conductor on any run of flexible metallic liquidtight conduit in excess of 6 feet. Thus, a secondary grounding conductor would be installed (and thus stretch between) the fittings installed on opposing ends of the length of conduit. Additionally, a grounding conductor may be installed between fittings used to terminate and/or couple non-metallic conduit.

Existing fittings are designed with a grounding lug permanently attached to the gland nut of the fitting or, alternatively, with the grounding lug attached via a screw to a predetermined position on the gland nut of the fitting. Although these earlier designs are functional in design, they often present installation problems for the installer. Specifically, when the grounding lug is permanently attached to the gland nut of the fitting, the installer cannot control the final angular position of the grounding lug relative to the conduit once the gland nut is tightened.

Thus, the grounding lug may not be positioned at an accessible location once the gland nut is tightened. The installer must therefore overtighten or undertighten the gland nut to locate the grounding lug at a suitable angular position. As will be appreciated by those skilled in the art, overtightening or undertightening may negatively impact the sealing between the components of the fitting. The location of the grounding lug on the gland nut of the fitting may also make tightening of the gland nut to the fitting difficult and/or infeasible in compact/crowded installation applications.

There is therefore a need in the art for a grounding lug/gland nut assembly which does not restrict the rotational orientation of the grounding lug until tightening of the gland to the body of the fitting. There is a further need in the art for a grounding lug/gland nut assembly which reduces and/or eliminates installation problems caused by interference of the grounding lug with adjacent hardware during the rotational tightening of the gland nut to the body of the fitting.

SUMMARY OF THE INVENTION

The present invention, which addresses the needs of the prior art, relates to a fitting for attachment to an end extent of a length of conduit. The fitting includes a body having a first mating section. The fitting further includes a gland nut sized for engagement with the first mating section. The gland nut includes a conduit-receiving opening to allow passage of the end extent through the gland nut into said body. The fitting additionally includes a seal sized to cooperate with the gland nut to seal the end extent within the body. Finally, the fitting includes a grounding coupling. The grounding coupling is engagable with an interior portion of the gland nut. The grounding coupling includes a grounding lug rotationally unrestrained with respect to the gland nut and located exteriorly to the gland nut wherein at least a portion of the grounding coupling extends through the conduit-receiving opening to provide an electrical pathway from the grounding lug to the interior portion of the gland nut whereupon the grounding coupling is electrically connected and fixedly coupled to the body upon tightening of the gland nut to the first mating section of the body.

As a result, the present invention provides a grounding lug/gland nut assembly which does not restrict the rotational orientation of the grounding lug until tightening of the gland nut to the body of the fitting. The present invention further provides a grounding lug/gland nut assembly which reduces and/or eliminates installation problems caused by interference of the grounding lug with adjacent hardware during the rotational tightening of the gland nut to the body of the fitting.

BRIEF DESCRIPTION OF THE DRAWINGS

FIG. 3 is an exploded view of the components of the fitting of the present invention;

FIG. 4 is a perspective view of the grounding coupling of the present invention;

FIG. 5 is a sectional view of the fitting of the present invention shown in FIG. 2;

FIG. 6 is a sectional view of an alternative embodiment of the present invention;

FIG. 7 is a sectional view of another alternative embodiment of the present invention.

DETAILED DESCRIPTION OF THE INVENTION

Figure 1:
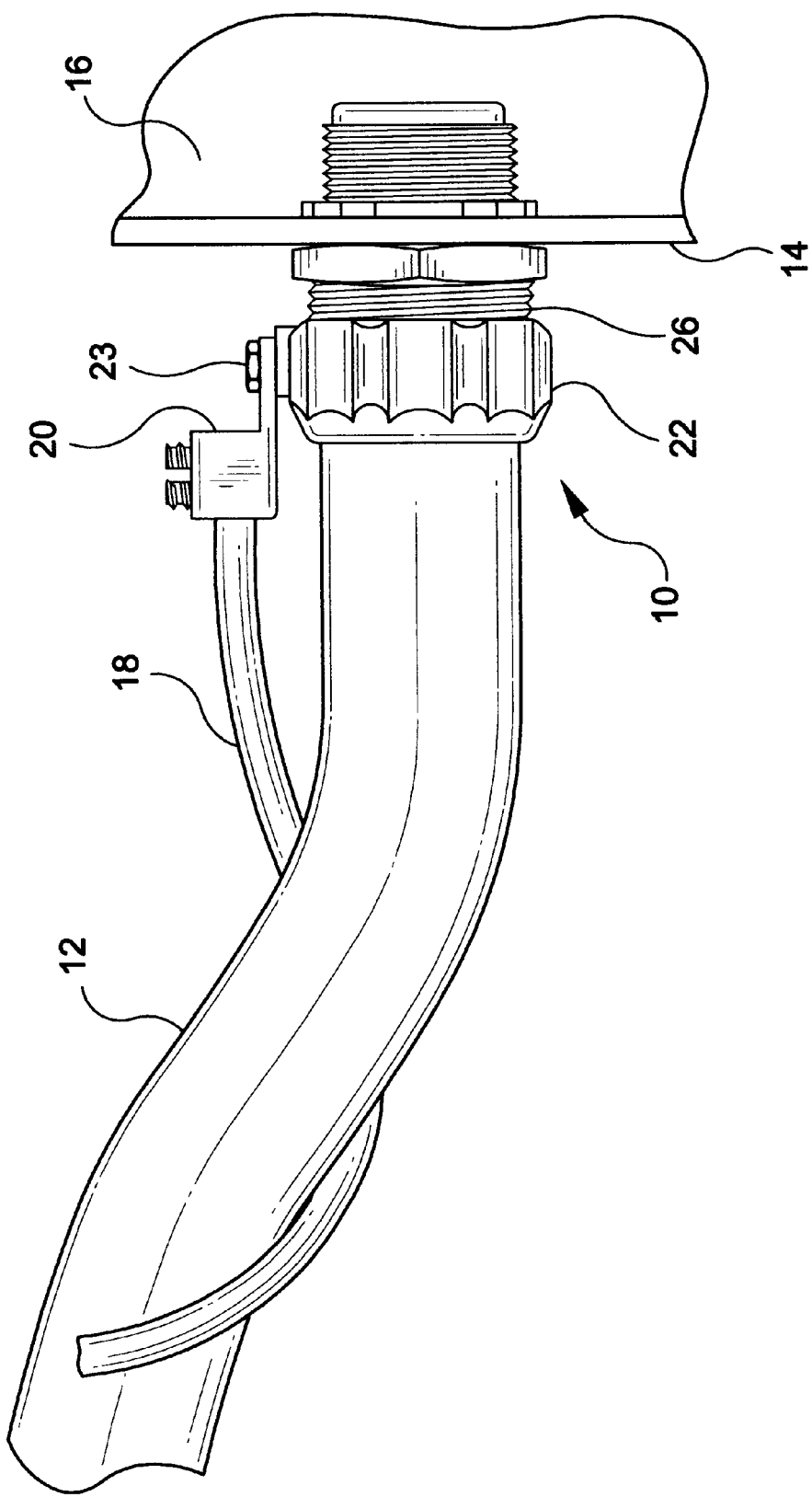
FIG. 1 is a partial elevational view of a prior art fitting including a gland nut with a angularly-fixed grounding lug attached thereto.

Referring to FIG. 1, a prior art liquidtight flexible metal conduit fitting 10 is shown terminating an end extent of a flexible metal conduit 12 to a wall 14 of an enclosure 16. As shown, grounding conductor 18 is secured within a grounding lug 20 attached to a gland nut 22 of fitting 10. Grounding lug 20 is attached to gland nut 22 via screw 23 such that the grounding lug is fixed at a predetermined angular position on the exterior of the gland nut.

As will be recognized by those skilled in the art, the final angular orientation of lug 20 is dependent upon the number of revolutions of gland nut 22 necessary to sufficiently tighten the gland nut to the body 26 of fitting 10. It will be appreciated that the final angular orientation of the grounding lug, once the gland nut is sufficiently tightened, may be inconvenient and/or inaccessible to the installer. Moreover, the location of the grounding lug on the exterior surface of the gland nut may contact and thus interfere with any proximately located hardware as the gland nut is rotated to tighten such gland nut to the body of the fitting.

Figure 2:
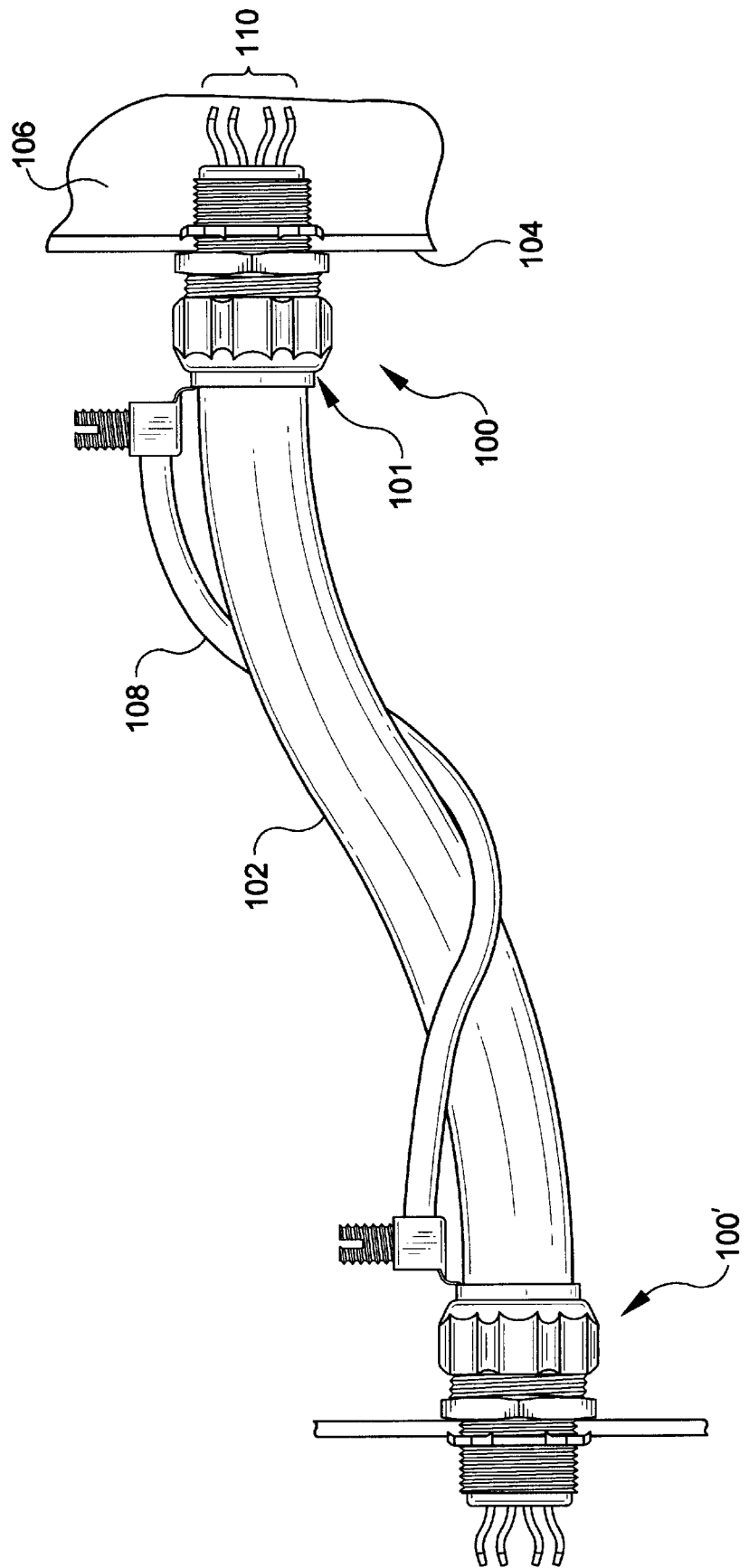
FIG. 2 is an elevational view showing a length of flexible metal conduit extending between opposing fittings of the present invention.

It has been discovered herein that a grounding lug/gland nut assembly may be used with conventional fittings to terminate and/or couple conduits, e.g., flexible metal conduit, non-metallic flexible conduit, non-metallic rigid conduit. Referring to FIG. 2, a fitting 100 including a grounding lug/gland nut assembly 101 is shown terminating a flexible metal conduit 102 to a wall 104 surrounding an enclosure 106. A grounding conductor 108 extends from fitting 100 to a second fitting 100' located at the opposing end of flexible metal conduit 102. As a result, fitting 100 and 100' are electrically connected to one another at a ground or 0 potential. Grounding conductor 108 is often referred to as an external bonding jumper.

Figure 2A:
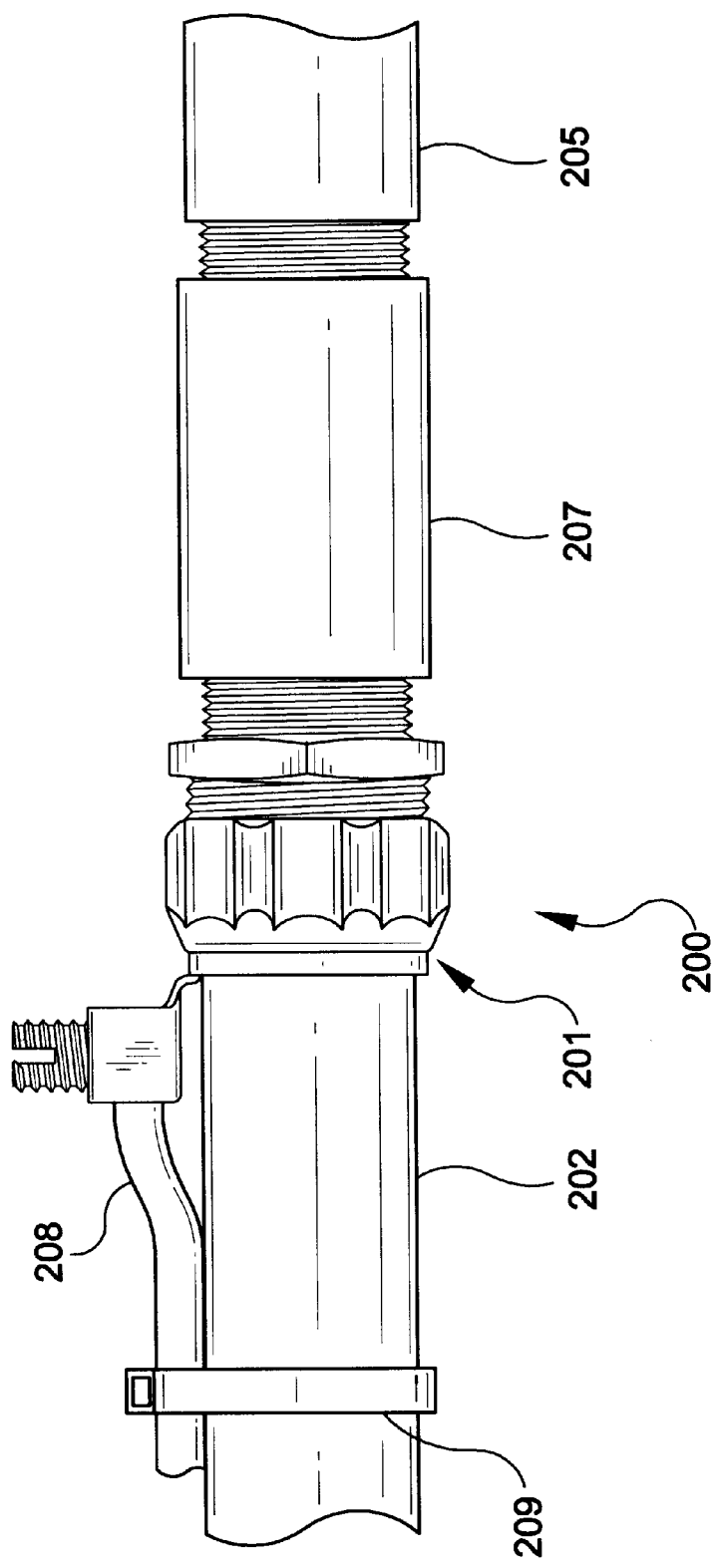
FIG. 2a is a partial elevational view of a fitting of the present invention connecting a portion of flexible metal conduit to a rigid conduit through a conduit coupling.

Fitting 100 shown in FIG. 2 is a liquidtight flexible metal conduit fitting. As a result, the electrical conductors i.e., conductors 110, extending through the conduit 102 are maintained in a liquidtight environment. Referring to FIG. 2a, fitting 200 formed in accordance with the present invention may be used to connect flexible metal conduit 202 to conduit 205 through coupling 207. Again, fitting 200 ensures a liquidtight connection between conduit 202 and conduit 205, thus ensuring that the conductors extending within the conduit are maintained in a liquidtight environment. As shown in FIG. 2a, grounding conductor 208 (which is electrically connected to fitting 200) may be secured to conduit 202 by means of a cable tie 209. Of course, alternative fitting embodiments may be used with the various types of conduit contemplated herein.

Referring to FIG. 3, the various components of fitting 100 are shown in exploded format. These components include grounding coupling 120, gland nut 122, sealing ring 124, ground cone 125, body 126, insulator 128 and lock nut 130. As will be recognized by those skilled in the art, the cooperation of gland nut 122 and sealing ring 124 ensure that flexible metal conduit 102 is terminated in a liquidtight fashion. More particularly, gland nut 122 wedges sealing ring 124 between the outer diameter of conduit 102 and the inner diameter of the fitting body 126. Ground cone 125 maintains electrical contact between the inner metallic lining (not shown) of the flexible metal conduit 102 and the body of the fitting (see FIG. 5). In embodiments using other than flexible metallic conduit, an internal support cone (not shown) similar in construction to grounding cone 125 may or may not be employed.

Gland nut 122, ground cone 125, fitting body 126 and the lock nut 130 are preferably formed from the zinc-plated steel. Of course, it is contemplated that other suitable materials could be used to form such components. Sealing ring 124 and insulator 128 are preferably formed of nylon. Again, it is contemplated that other suitable materials could be used to form such components.

Grounding coupling 120 is shown in detail in FIG. 4. Grounding coupling 120 includes a tubular support base 132 having an inner diameter $D_1$, an outer diameter $D_2$ and a length 1 (see FIG. 3). Grounding coupling 120 further includes a circumferentially extending flare 134 on a first circumferentially extending edge 136. Flare 134 preferably includes a plurality of protuberances 138 spaced around the circumference of the flare to create frictional engagement between flare 134 and one of the two chamfered edges, i.e., chamfered edge 124a, of the sealing ring (see FIG. 3) as the gland nut is tightened onto the body of the fitting. This frictional engagement facilitates the assembly of the various components.

On the side of the support base opposite flare 134 is a grounding lug 140, preferably co-extensive and integral with an arm 142 extending from a second edge 144 of support base 132. Grounding lug 140 defines an enclosure 146 and includes a threaded passage 148 for receipt of a set screw 150 (see FIG. 3). Set screw 150 is adapted to be threadably inserted through passage 148 into engagement with the grounding conductor extending through the enclosure defined by the lug. When screw 150 is tightened against the grounding conductor, the grounding conductor is both frictionally retained within the enclosure and is maintained in electrical communication with the grounding coupling. In turn, the grounding coupling is in electrical communication with the gland nut and body of the fitting through physical contact of such components.

Figure 4A:
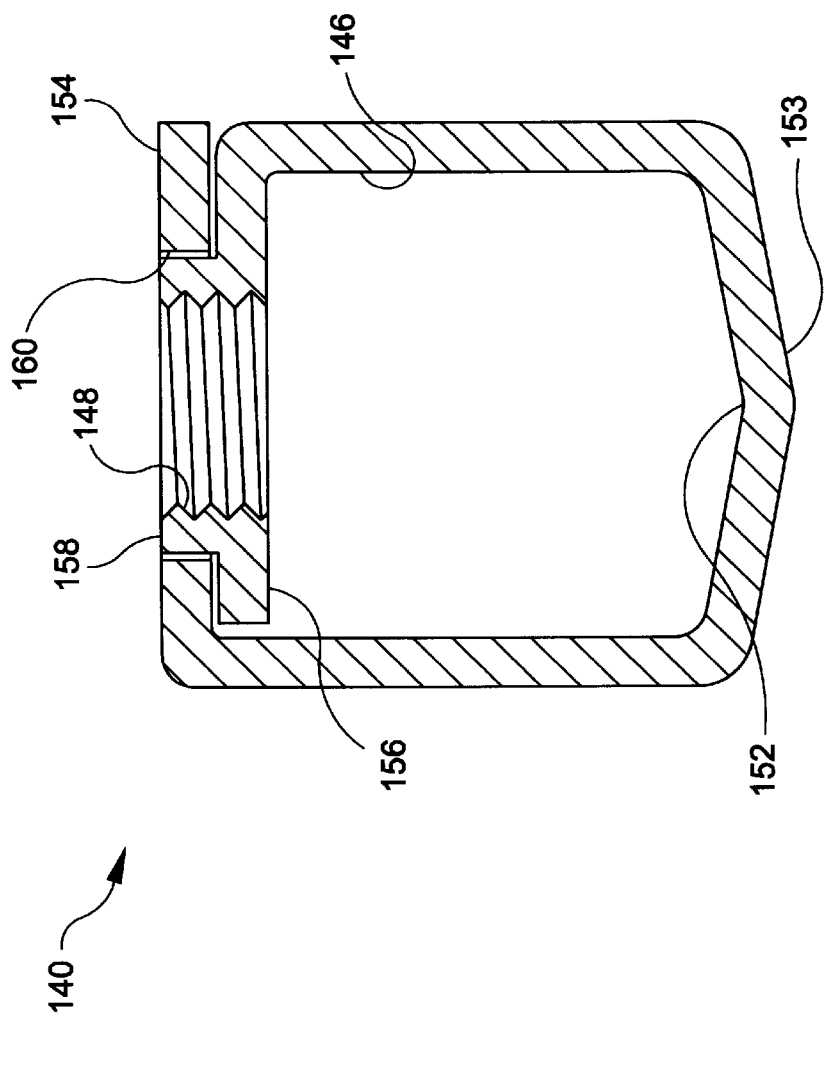
FIG. 4a is a sectional view taken along lines 4a—4a of FIG. 4.

Referring to FIG. 4a, enclosure 146 is preferably formed with a V-shaped channel 152 in its bottom wall 153 which facilitates the centering of the grounding conductor in the enclosure and which limits pinching of the conductor caused by overtightening of the set screw. More particularly, the set screw cannot be advanced so far or tightened to such a degree as to completely crush the conductor thereunder.

Enclosure 146 is partially defined by legs 154 and 156, wherein leg 154 is folded over leg 156 to form the upper wall of the enclosure. In this regard, threaded passage 148 is formed in leg 156 by piecing a hole in the metal and thereafter extruding a circular jacket 158, such jacket then being threaded for receipt of the set screw. A circular opening 160 sized to surround jacket 158 is formed in leg 154. Leg 154 is then folded over leg 156 such that the cooperation of jacket 158 and opening 160 imparts structural rigidity to the grounding lug. Moreover, the threaded jacket provides one set of uninterrupted threads through the double metal thickness defining the upper wall of the enclosure.

Grounding coupling 120 is preferably formed from a highly conductive, high tensile strength and corrosion resistant metal such as brass. Of course, other suitable metals could be used to form the grounding coupling.

As described hereinabove, the grounding coupling is preferably an integrally formed component. In one preferred embodiment, the grounding coupling is formed from a strip of flat stock wherein a portion of such strip is pierced and extruded to form the tubular support base. Another portion of the strip is thereafter cut and rolled to form the enclosure which receives the grounding conductor. Of course, other manufacturing processes may be used to form the grounding coupling.

Other embodiments of the grounding coupling are also contemplated. For example, the lug enclosure could be formed as a separate component which is thereafter secured (either permanently or removably) to arm 142. Additionally, the lug portion could be secured directly to support base 132 of the coupling.

The design and configuration of arm 142 involves the balancing of several variables including material choice, material strength, arm width, arm length, arm thickness, electrical conductivity and resistance to flexure. More particularly, the arm must have a sufficient cross-sectional area as to pass the required quantity of current without failure, e.g., in accordance with Underwriters Laboratories Inc. (UL) Current Test No. 467 § 13. It will be recognized that highly conductive materials such as copper will more readily pass such electricity. Simultaneously, the arm must have sufficient mechanical integrity as to resist flexure and prevent structural failure due to loading, e.g., in accordance with Underwriters Laboratories Inc. (UL) Mechanical Sequence Test No. 486a §§ 10, 12. It will be recognized that materials such as steel exhibit these suitable characteristics.

It has been discovered herein that a brass grounding coupling having an arm thickness of approximately 0.040", an arm width of approximately 0.5" and a minimum arm length can satisfy the aforementioned variables. Moreover, the arm may be formed with ribs (not shown) to enhance the stiffness thereof.

As will be appreciated by those skilled in the art, the tubular support base of grounding coupling 120 surrounds the exterior of the flexible metal conduit. As the flexible metal conduit is flexed, the angular forces experienced by the conduit tend to pull the conduit out of the fitting. The tubular support base of the grounding coupling of the present invention is preferably of a sufficient length 1 as to function as a strain relief against such forces (by transferring such forces to the fitting), thus reducing and/or eliminating the tendency of the conduit to pull out of the fitting and/or to cause leaking of the fitting.

As best seen in FIG. 5, the outer diameter (i.e., diameter $D_2$) of grounding coupling 120 is dimensioned to allow passage of tubular support base 132 through conduit-receiving opening 162 of gland nut 122. In turn, inner diameter $D_2$ of support base 132 is of sufficient size as to allow conduit 102 to pass therethrough. Thus, conduit-receiving opening 162 must be sized to allow simultaneous passage of the conduit and the support base therethrough.

Flare 134 has a diameter (i.e., diameter $D_3$) greater than the diameter of conduit-receiving opening 162 such that grounding coupling 120 when inserted into fitting 110 is securably coupled thereto. As will be appreciated by those skilled in the art, the design and configuration of grounding coupling 120, particularly tubular support base 132 and flare 134, allows the grounding coupling to be securely coupled to the gland, yet remain rotationally unrestrained until such time as the gland is sufficiently tightened on the fitting.

More particularly, as the gland nut is tightened onto the body of the fitting, flare 134 is forced against chamfered edge 124a (see FIG. 3) of sealing ring 124. Inasmuch as sealing ring 124 is formed of a soft material, such as nylon, the forcing of flare 134 against chamfered edge 124a will cause such edge to collapse inwardly against the outer diameter of the flexible metal conduit extending therethrough, thus forming a seal thereabout. Similarly, as gland nut 122 tightened onto fitting body 126, chamfered edge 124b is forced into engagement with flare 164 (see FIG. 3) of ground cone 125. Again, this engagement causes chamfered edge 124b to collapse inwardly against the outer diameter of the flexible metal conduit extending therethrough, thus creating a seal thereabout. Moreover, the tightening of the gland nut onto body 126 causes the sealing ring to wedge between the outer diameter of the conduit and the inner diameter of body 126.

In another embodiment of the present invention, as shown in FIG. 6, the grounding coupling, i.e., grounding coupling 220, includes a ring-shaped support base 232 having an aperture 233 therethrough sized to allow passage of the conduit through such coupling and into the body of the fitting. Coupling 220 further includes grounding lug 240. Base 232 includes an arm 242 secured thereto and located to allow extension of grounding lug 240 through conduit-receiving opening 162 in gland nut 122 in the presence of the conduit. As shown, surface 232a of base 232 engages an interior portion of the gland nut about the periphery of the conduit opening, while surface 232b presses against the sealing ring when the fitting is assembled.

In another embodiment of the present invention, as shown in FIG. 7, a slot 366 is formed in the interior of gland nut 322 about the periphery of the conduit-receiving opening. The slot is sized to receive a lip 334 formed on the edge of grounding coupling 320 opposite the lug. The grounding coupling including the lip may be pressed into the slot to permanently connect the two components in a rotationally unrestrained manner. A grounding coupling having a "split ring" tubular support base is particularly suitable for such an embodiment. In this regard, the split ring allows the support base of the coupling to be radially collapsed for insertion into the gland nut whereupon release of the support base allows such base to expand, thus causing the lip to be captured within the slot and rotatably securing the grounding coupling to the gland nut. Upon tightening of the gland nut to the fitting body, the grounding coupling is firmly pressed against the wall of the slot, thus ensuring electrical communication between the coupling and the gland nut. Of course, the flared embodiment shown in FIG. 4 or the ring-shaped embodiment shown in FIG. 6 can also be used with a slotted gland nut.

Figure 8:
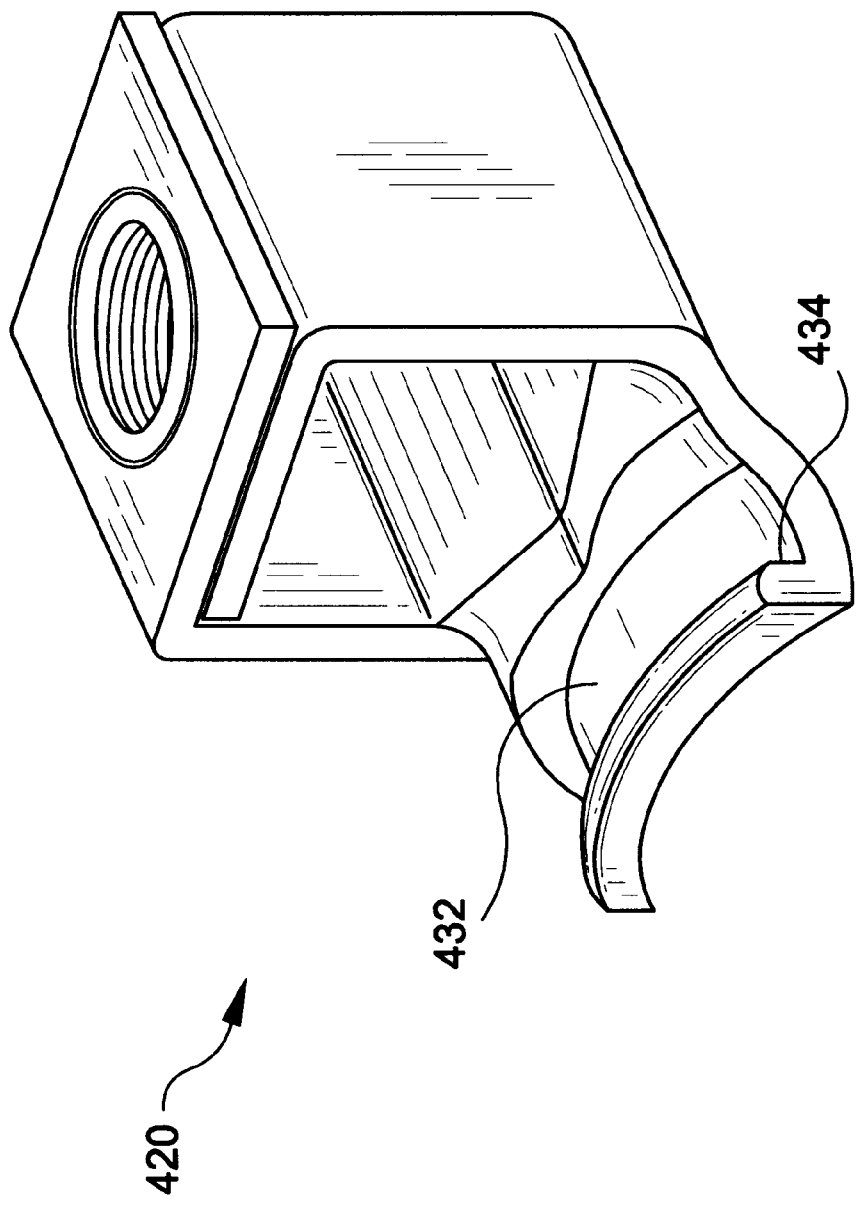
FIG. 8 is a sectional view of still another alternative embodiment of the present invention.

In a still further embodiment, as shown in FIG. 8, the grounding coupling, i.e., grounding coupling 420, includes an arc-shaped support base 432 having a lip 434 formed on one edge thereof. The lip, which is preferably formed perpendicular to the support base, cooperates with the gland to secure the coupling within the fitting, but without rotationally restraining the coupling until tightening of the gland nut to the fitting body. The conduit itself acts against the other side of the support base to ensure retention of the coupling within the fitting. Grounding coupling 420 may be used with gland nut 122 or with slotted gland nut 322.

While there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A fitting for attachment to an end extent of a length of conduit, comprising:

a body having a first mating section;

a gland nut sized for engagement with said first mating section, said gland nut including a conduit-receiving opening to allow passage of said end extent through said gland nut into said body;

a seal sized to cooperate with said gland nut to seal said end extent within said body;

a grounding coupling, said grounding coupling engagable with an interior portion of said gland nut, said grounding coupling including a grounding lug rotationally unrestrained with respect to said gland nut and located exteriorly to said gland nut, and wherein at least a portion of said grounding coupling extends through said conduit-receiving opening to provide an electrical pathway from said grounding lug to said interior portion of said gland nut whereupon said grounding coupling is electrically connected and fixedly coupled to said body upon tightening of said gland nut to said first mating section of said body;

wherein said grounding coupling includes a support base and an arm extending therefrom, and wherein said grounding lug is located on said arm; and wherein said arm is formed from a metal having a predetermined conductivity vs. tensile strength relationship, and wherein said arm has a cross-sectional area sufficient to conduct a required amount of current without failure and sufficient to provide said grounding lug with mechanical resistance to flexure.

2. The fitting according to claim 1, wherein said support base includes passage limiting means located thereon to cooperate with said interior portion of said gland nut.

3. The fitting according to claim 2, wherein said passage limiting means comprises a circumferentially-extending flare.

4. The fitting according to claim 2, wherein said passage limiting means comprises at least one lip projecting radially outward from said support base and circumferentially extending around at least a portion of said support base.

5. The fitting according to claim 1, wherein said grounding coupling engages said interior portion of said gland nut about the periphery of said conduit-receiving opening.

6. The fitting according to claim 1, wherein said support base is ring-shaped and includes an aperture therethrough sized to allow passage of said end extent through said support base into said body.

7. The fitting according to claim 1, wherein said support base is tubular and includes passage limiting means located on one edge thereof, and wherein said tubular support base is sized for passage through said conduit-receiving opening of said gland nut to a position whereat further advancement through said conduit-receiving opening is limited by engagement of said passage limiting means with said interior portion of said gland nut, said tubular support base coaxially arranged with respect to said end extent of conduit upon assembly of said fitting.

8. The fitting according to claim 1, wherein said seal comprises a ring sized to allow passage of said end extent therethrough, said ring including a pair of opposing chamfered sealing edges;

further comprising a ground cone sized for receipt of said end extent therein, said ground cone including a flared sealing edge; and wherein said grounding coupling presses against one of the chamfered sealing edges and said flared sealing edge presses against the other of said chamfered sealing edges when said gland nut is tightened to said first mating section of said body.

9. The fitting according to claim 8, wherein said grounding coupling includes at least one frictionally-enhancing portion located to frictionally engage said one chamfered edge.

10. The fitting according to claim 1, wherein said grounding lug is integrally formed and coextensive with said arm.

11. The fitting according to claim 1, wherein said grounding lug defines an enclosure adapted for receipt of a grounding conductor therein, said grounding lug including a set screw advancable through a wall of said enclosure whereupon advancement of said set screw through said wall frictionally retains said grounding conductor within said enclosure.

12. The fitting according to claim 11, wherein said enclosure includes a channel opposite said threaded opening for receipt of said grounding conductor therein.

13. The fitting according to claim 11, wherein said wall is defined by an inner leg superposed and contiguous with an outer leg, said outer leg including an aperture therethrough, said inner leg including an extruded jacket protruding towards said outer leg and through said aperture, said jacket being threaded to provide an uninterrupted set of threads for advancement of said set screw through said legs.

14. The fitting according to claim 1, wherein said body includes a second mating section; and further comprising an insulator sized for engagement with an interior portion of said second mating section and a lock nut sized for engagement with said second mating section.

15. The fitting according to claim 14, wherein said first and second mating sections comprise externally-threaded tubular portions of said body.

* * * * *